US010171379B2

(12) United States Patent
Apte et al.

(10) Patent No.: US 10,171,379 B2
(45) Date of Patent: Jan. 1, 2019

(54) DYNAMIC SERVICE LEVEL AGREEMENT (SLA) ADJUSTMENT BASED UPON APPLICATION CAPABILITIES

(71) Applicant: International Business Machines Corporation, Armonk, NY (US)

(72) Inventors: Ajay A. Apte, Austin, TX (US); Kirti A. Apte, Austin, TX (US); Jianfeng Kong, Richmond Hill (CA); Zhao Liu, Beijing (CN); Lin Sun, Morrisville, NC (US); Shu Chao Wan, Beijing (CN); Li Yi, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 280 days.

(21) Appl. No.: 14/551,046

(22) Filed: Nov. 23, 2014

(65) Prior Publication Data
US 2016/0149772 A1 May 26, 2016

(51) Int. Cl.
*H04L 12/24* (2006.01)
*H04L 29/08* (2006.01)
(Continued)

(52) U.S. Cl.
CPC ........ *H04L 47/805* (2013.01); *H04L 41/0853* (2013.01); *H04L 41/5006* (2013.01);
(Continued)

(58) Field of Classification Search
CPC . H04L 41/5054; H04L 41/5025; H04L 67/10; H04L 41/5006; H04L 67/16; H04L 41/0853; H04L 47/805; H04L 12/24; H04L 29/08; H04L 29/08144; H04L 29/06; H04L 29/08072; H04L 29/08171; H04L 12/5695; H04L 12/927
(Continued)

(56) References Cited

U.S. PATENT DOCUMENTS

2003/0046396 A1\* 3/2003 Richter .................. G06F 9/505
709/226
2006/0080657 A1\* 4/2006 Goodman ............. G06F 9/5061
717/177
(Continued)

*Primary Examiner* — Backhean Tiv
*Assistant Examiner* — Mehulkumar J Shah
(74) *Attorney, Agent, or Firm* — Steven M. Greenberg, Esq.; Shutts & Bowen LLP

(57) ABSTRACT

Embodiments of the invention provide a method, system and computer program product for the dynamic adjustment of a service level agreement (SLA) for a hosted computing environment based upon application capabilities. The method includes specifying in a user interface to the hosted computing environment one or more application components of an application to be hosted within the hosted computing environment. Thereafter, a resource utilization capability is determined for one of the components and a set of resource utilization options for an SLA for the application is filtered based upon the resource utilization capability of the component or components. One of the filtered set of options can be selected and the application is executed in the hosted computing environment. Finally, the utilization of resources accessible to the application is managed based upon the SLA during the execution of the application in the hosted computing environment.

14 Claims, 2 Drawing Sheets

(51) Int. Cl.
*H04L 12/927* (2013.01)
*H04L 29/06* (2006.01)

(52) U.S. Cl.
CPC .......... *H04L 41/5025* (2013.01); *H04L 67/10* (2013.01); *H04L 67/16* (2013.01); *H04L 67/30* (2013.01); *H04L 69/24* (2013.01)

(58) Field of Classification Search
USPC .................. 709/226, 223; 370/254; 710/240
See application file for complete search history.

(56) References Cited

U.S. PATENT DOCUMENTS

| | | | |
|---|---|---|---|
| 2011/0087843 A1* | 4/2011 | Zhao | G06F 12/0864 711/129 |
| 2012/0330711 A1* | 12/2012 | Jain | G06F 9/5072 705/7.23 |
| 2013/0054776 A1* | 2/2013 | Kunze | G06F 9/5061 709/224 |
| 2013/0080641 A1* | 3/2013 | Lui | H04L 67/10 709/226 |
| 2013/0174149 A1* | 7/2013 | Dasgupta | G06F 9/5072 718/1 |
| 2014/0007097 A1* | 1/2014 | Chin | G06F 9/45533 718/1 |
| 2014/0129710 A1 | 5/2014 | Bartfai-Walcott et al. | |
| 2015/0180736 A1* | 6/2015 | Leung | H04L 41/5054 709/226 |

\* cited by examiner

DYNAMIC SERVICE LEVEL AGREEMENT (SLA) ADJUSTMENT BASED UPON APPLICATION CAPABILITIES

BACKGROUND OF THE INVENTION

Field of the Invention

The present invention relates to resource configuration in an application host and more particularly to service level agreement (SLA) driven resource management in a hosted application computing environment.

Description of the Related Art

A hosted application environment is an environment in which different applications can be deployed for utilization by multiple different end users over a computer communications network. In a hosted application environment, different resources can be accessed by a hosted application including disk space, memory and instruction processing. Further, middleware including a database management system and an application server can be provided for use by applications deployed within the hosted application environment.

Originally, host application environments had been architected and implemented manually. In manually architected host application environments, the information technologists assembles a customized combination of supporting hardware devices onto which the various supporting middleware components are installed and configured so as to provide for the hosted application environment. Plainly, the process of configuring and deploying a hosted application environment that has been manually architected can take days if not weeks and in most cases, can result in operational problems due to unknown incompatibilities between hardware and software, or inappropriate configuration settings.

To address the problem of lengthy deployments and the probability of operational problems, pre-packaged fully integrated application environments have been developed in the form of a singular appliance. The singular appliance then can be deployed into the computing environment in a matter of minutes. Since the singular appliance is factory integrated and tested for interoperability, no operational problems result and the hosted application environment provided thereby can be ready to accept a deployment of an application immediately upon installation into the network.

Integrated hosted environment appliances include SLA driven management of environment resources. In this regard, the terms of an SLA can be loaded into memory and the performance of a corresponding application within the hosted environment monitored. As the performance of the application deteriorates to the point of a potential breach of the SLA, additional resources within the hosted application environment can be deployed, for instance a new virtual machine, additional memory, additional storage space and the like. Conversely, as the performance of the application is determined to well exceed the terms of the SLA, resources previously allocated for use by the application can be reduced.

In order to afford flexibility to the end user, integrated hosted computing environments are variably configurable according to one of several supplied virtual application patterns. Each pattern corresponds to a particular computing scenario for the end user, such as a particular type of industry application. In this regard, a virtual application pattern represents a collection of application components, behavioral policies, and their relationships. Core components of the pattern include web applications, databases, queues, connections to existing resources, business process models, batch jobs, mediations, etc. Core policies of the pattern include high availability, SLAs, security, multi-tenancy and isolation. Yet, the capabilities of different applications hosted within the hosted application environment often differ in respect to how resources can scale or de-scale as the case may be. Some applications may scale both vertically in respect to the addition or removal of processors, but not horizontally in respect to the addition or removal of virtual machines. Others may do both.

BRIEF SUMMARY OF THE INVENTION

Embodiments of the present invention address deficiencies of the art in respect to SLA management in a hosted application environment and provide a novel and non-obvious method, system and computer program product for the dynamic adjustment of an SLA for a hosted computing environment based upon application capabilities. In an embodiment of the invention, the method includes specifying in a user interface to the hosted computing environment one or more application components of an application to be hosted within the hosted computing environment. Thereafter, a resource utilization capability can be determined for at least one of the components and a set of resource utilization options for an SLA for the application can be filtered based upon the resource utilization capability of the component or components. One of the filtered set of resource utilization options for the SLA can be selected and the application can be executed in the hosted computing environment. Finally, utilization of resources accessible to the application are managed based upon the SLA during the execution of the application in the hosted computing environment.

In one aspect of the embodiment, the resource utilization capability is a scaling and de-scaling capability and the resource utilization options for the SLA include a range of resource utilization outside of which resources are either added for scaling or removed for de-scaling. In another aspect of the embodiment, the resource utilization capability is a caching capability. In the former instance, the scaling and de-scaling capability includes a capability of vertical scaling and horizontal scaling. Alternatively, the scaling and de-scaling capability includes a capability of vertical scaling but not horizontal scaling, or horizontal scaling but not vertical scaling. In yet another aspect of the embodiment, the resource utilization capability is determined for a multiplicity of components of the application and the resource utilization options are filtered for the SLA based upon a most limited resource utilization capability determined amongst all of the components.

In another embodiment of the invention, a host computing environment data processing system is configured for dynamic adjustment of an SLA for a hosted computing environment based upon application capabilities. The system includes a host computing device comprising memory and at least one processor and one or more middleware application components supporting different applications to be deployed into the host computing device. A table of capabilities for the middleware application components also can be provided along with a dynamic SLA adjustment module executing in the memory of the host computing device. The module includes program code enabled to specify in a user interface presented in a display of the host computing device one or more of the application components of a particular one of the different applications, to determine from the table a resource utilization capability for at least one of the components, to filter a set of resource utilization options for an SLA for the particular one of the different applications based upon the resource utilization capability of the at least one of the components and to select one of the filtered set of resource utilization options for the SLA, and to execute the application in the host computing device and to manage utilization of resources accessible to the application based upon the SLA during the execution of the application.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for dynamic adjustment of an SLA for a hosted computing environment based upon application capabilities. In accordance with an embodiment of the invention, one or more application components of an application to be deployed into a hosted computing environment are specified. The scaling capability of each of the application components can be determined. Thereafter, configuration options for a scaling policy for the application can be filtered to include only configuration options viable for the scaling capability of all of the application components. One or more of the configuration options can be selected and an SLA for the application can be established according to the configuration options and the application can be executed in the hosted computing environment and resources can be dynamically scaled and de-scaled in the hosted computing environment in accordance with the SLA.

Figure 1:
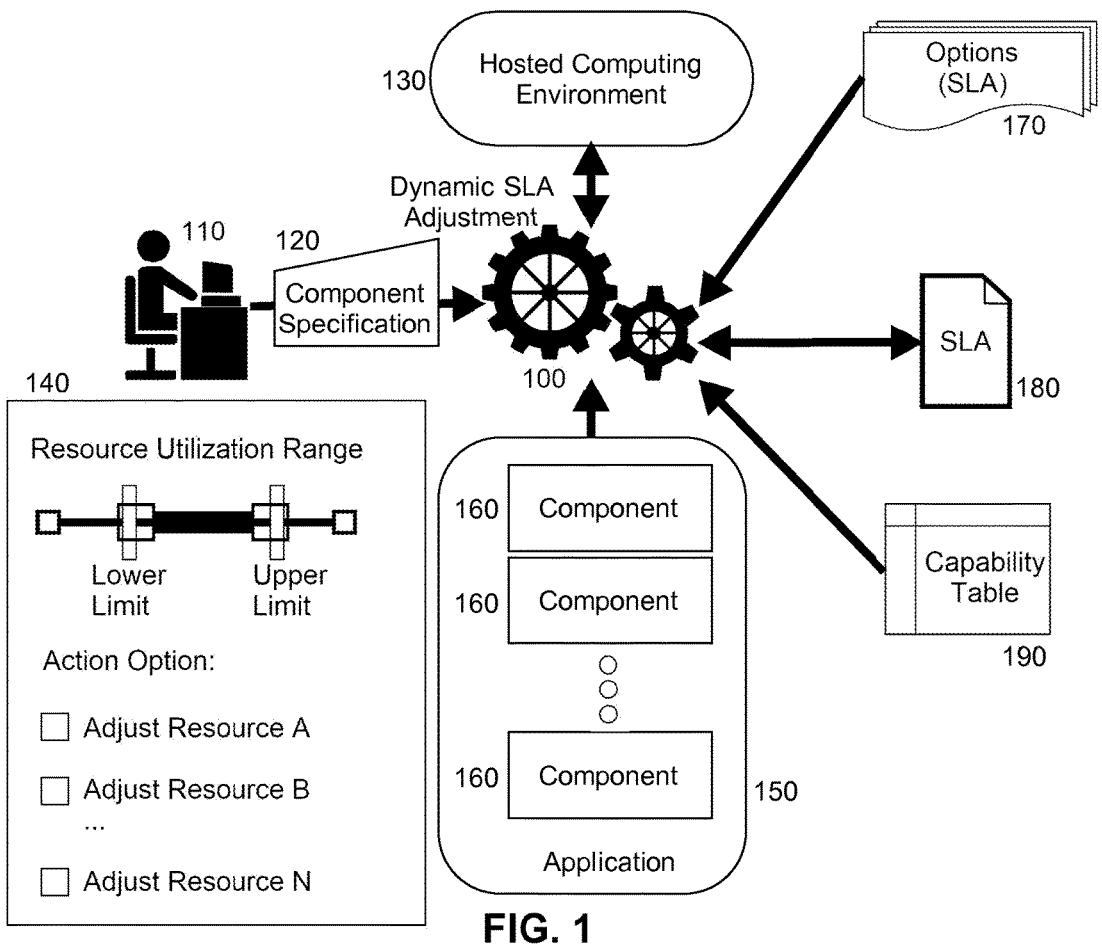
FIG. 1 is a pictorial illustration of a process for dynamic adjustment of an SLA for a hosted computing environment based upon application capabilities.

In further illustration, FIG. 1 pictorially shows a process for dynamic adjustment of an SLA for a hosted computing environment based upon application capabilities. As shown in FIG. 1, an end user 120 can provide a specification 120 of one or more components 160 for inclusion in an application 150 to be deployed into a hosted computing environment 130. Dynamic SLA adjustment logic 100 can determine from the specification 120 one or more capabilities within a table of capabilities 190. Those capabilities include, for example, whether or not one or more of the components 160 support placement of corresponding instances of the components 160 in one or more of multiple different nodes, whether or not one or more of the components 160 support the utilization of multiple different processors within the hosted computing environment 130, or both.

Based upon the determined capabilities, the dynamic SLA adjustment logic 100 can filter a set of resource utilization options 170 for consideration in modifying an SLA 180 for the application 150. In this regard, a user interface 140 can be presented to the end user 110 in which the filtered set of the options 170 can be displayed. The end user, in turn, can select an option from amongst the filtered set of the options 170 to be triggered when resource utilization within the hosted environment 130 falls outside of a specified range. For example, in the context of scaling, the selected option can be one of horizontal scaling—that is the addition or removal of nodes in the hosted computing environment—or one of vertical scaling—that is the addition or removal of processors—or both. The selected option along with the specified range can be persisted into the SLA 180 for use in managing the resources of the hosted computing environment 130 during the operation of the application 150.

Figure 2:
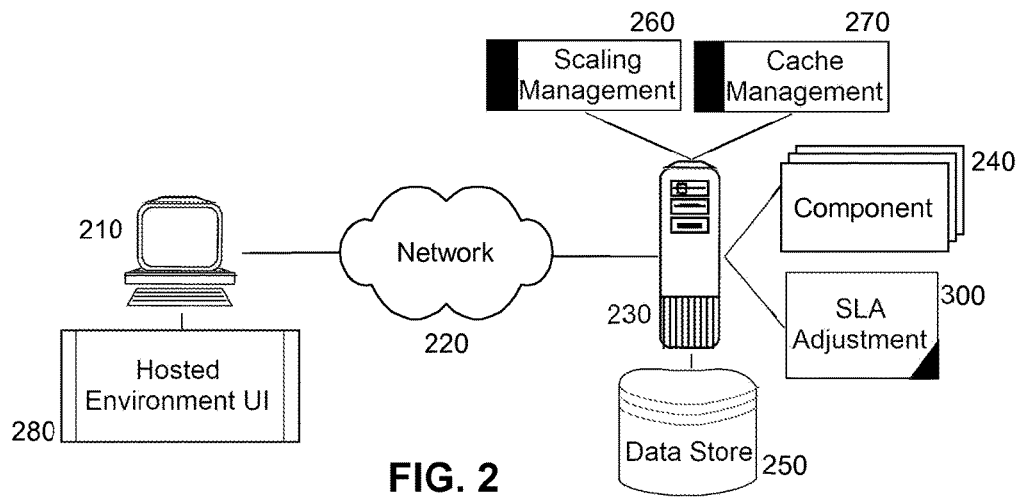
FIG. 2 is a schematic illustration of a hosted computing environment data processing system configured for dynamic adjustment of an SLA based upon application capabilities; and, FIG. 3 is a flow chart illustrating a process for dynamic adjustment of an SLA for a hosted computing environment based upon application capabilities.

The process described in connection with FIG. 1 can be implemented within a hosted computing environment data processing system. In further illustration, FIG. 2 schematically shows a hosted computing environment data processing system configured for dynamic adjustment of an SLA based upon application capabilities. The system can include a host computing system 230 that can include computing resources such as one or more physical computing devices, each with memory and one or more processors and access to a data store 250. The host computing system 230 can provide a hosted computing environment supporting operation of one or more application instances, each utilizing different middleware components 240 of the host computing environment. In particular, the host computing environment can be configured to deploy therein different applications according to respectively different virtual application patterns.

Of note, utilization of the resources of the host computing environment provided by the host computing system 230 in accordance with a selected virtual application pattern can be managed in accordance with resource utilization processes, such as scaling management 260 and cache management 270 supported by the selected virtual application pattern. Scaling management 260 can monitor an SLA of the selected virtual application pattern for an application executing in the host computing environment and can adjust resource utilization in the host computing system 230 such as access to different processors of the host computing system 230, or different nodes of the host computing system 230, or both. Likewise, cache management 270 can provide data caching services to different applications executing in the host computing environment.

An SLA adjustment module 300 can be coupled to the host computing system 230. The SLA adjustment module 300 can include program code that when executed within the memory of the host computing system 230, can present a hosted environment user interface 280 in a client computer 210 over a computer communications network 220. The user interface 280 can include a set of available ones of the components 240 amongst which one or more of the components 240 can be specified for utilization in an application deployable within the host computing environment. The program code of the SLA adjustment module 300 further can be enabled based upon the specification of the components 240 to filter a set of resource utilization options in accordance with the capabilities of one or more of the specified ones of the components 240. The filtered set of resource utilization options then can be presented by the program code in the hosted environment user interface 280.

Thereafter, the program code of the SLA adjustment module 300 can select one or more of the resource utilization options and the SLA adjustment module 300 can modify an SLA for the application to include the selected resource utilization options. More particularly, the modified SLA can be included within the selected virtual application pattern defined for the host computing environment. The hosted computing environment in turn can invoke scaling management 260, cache management 270 or both during execution of the application in the host computing environment responsive to the terms of the modified SLA.

Figure 3:
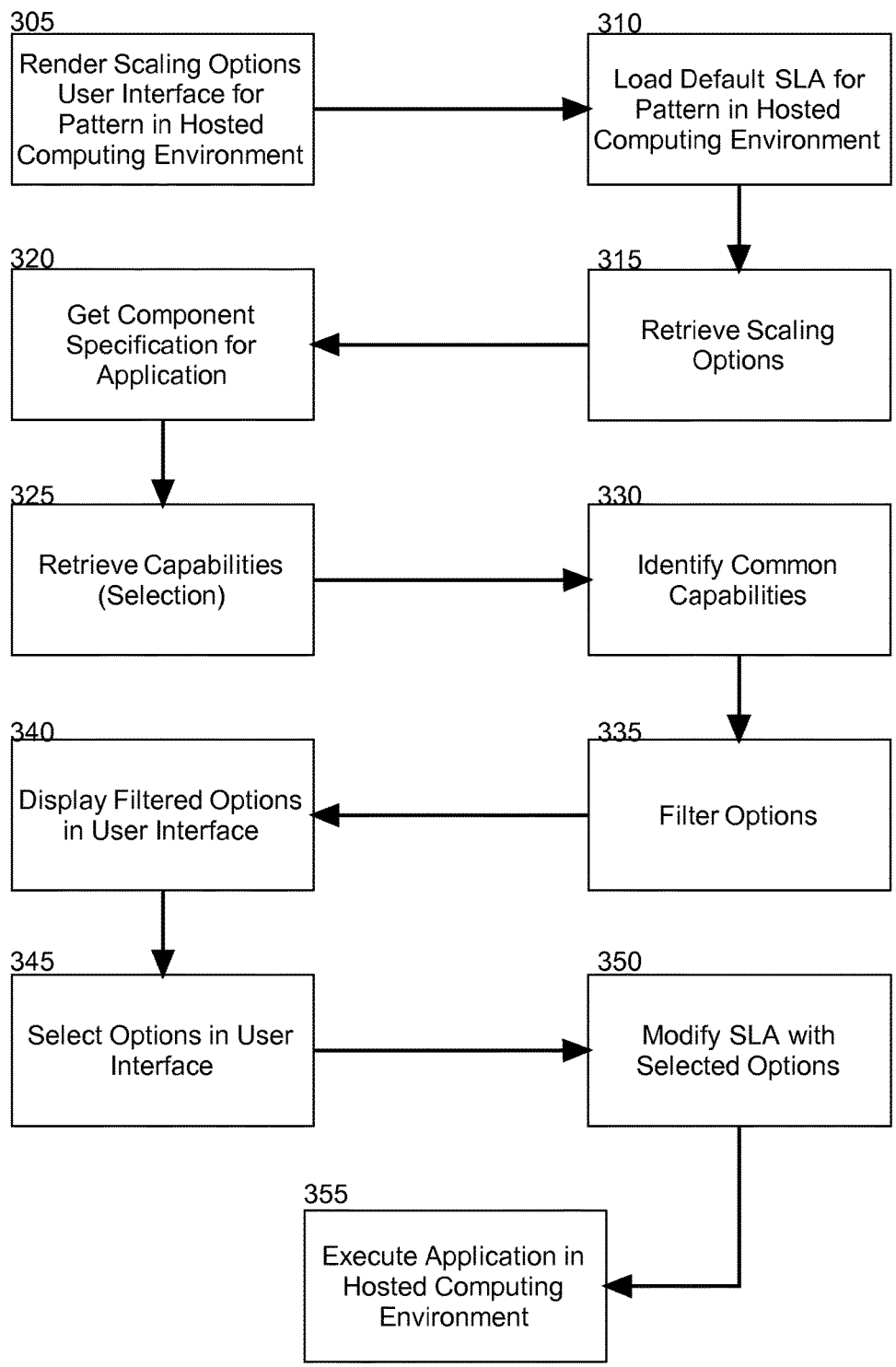

In even further illustration of an exemplary aspect of the operation of the SLA adjustment module 300, FIG. 3 is a flow chart illustrating a process for dynamic adjustment of an SLA for a hosted computing environment based upon application capabilities. Beginning in block 305, a user interface providing different scaling options for an application can be rendered in a user interface for a virtual application pattern of a hosted computing environment. In block 310, a default SLA for the virtual application pattern can be loaded and in block 315, one or more scaling options can be determined for the virtual application pattern. In block 320, a specific component or set of components can be specified for the application within the user interface. Thereafter, one or more capabilities of one of more of the specified components can be determined.

In block 330, common capabilities can be determined for each of the specified components. Those capabilities can include, for example, the ability to support horizontal scaling, vertical scaling or both. In block 335, the loaded scaling options can be filtered to accommodate the common capabilities of the specified components. Subsequently, in block 340 the filtered set of scaling options can be presented within the user interface and one or more of the filtered set of scaling options can be selected through the user interface in block 345. Finally, in block 350 the loaded SLA can be modified to include the selected scaling options and in block 355, the execution of the application can be moderated within the hosted computing environment in accordance with the modified SLA. Specifically, resources utilized by the application within the hosted computing environment can be scaled up or down in accordance with the performance of the hosted computing environment in hosting the execution of the application and the terms of the modified SLA.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A hosted computing environment data processing system configured for dynamic adjustment of a service level agreement (SLA) for a hosted computing environment based upon application capabilities, the system comprising:

a host computing device comprising memory and at least one processor;

a plurality of middleware application components supporting different applications to be deployed into the host computing device;

a table of capabilities for the middleware application components, the table specifying capabilities of different components including both whether or not one or more of the components support placement of corresponding instances of the components in one or more of multiple different nodes and also whether or not one or more of the components support the utilization of multiple different processors within the hosted computing environment; and, a dynamic SLA adjustment module executing in the memory of the host computing device and comprising program code enabled:

to specify in a user interface presented in a display of the host computing device a virtual application pattern comprising one or more of the application components of a particular one of the different applications, a behavioral policy, at least one database, at least one queue, at least one connection to an existing resource, a business process model, a batch job and a mediation, the policy specifying high availability, security, multi-tenancy, isolation and an SLA, to load the SLA into memory and determine for the specified one or more of the application components from the table a scaling capability for the specified one or more of the application components of the pattern and, in particular, both whether or not the one or more of the application components support placement of corresponding instances of the application components in one or more of multiple different nodes in the hosted computing environment, and also whether or not the one or more of the application components support utilization of multiple different processors within the hosted computing environment, to filter a set of resource utilization options for the SLA of the pattern for the particular one of the different applications based upon a common scaling capability determined of all of the components, to select one of the filtered set of resource utilization options for the SLA, and modify the SLA for the application utilizing the selected resource utilization options so as to scale up resources utilized by the components of the application, and to execute the application in the host computing device, and manage utilization of resources accessible to the application based upon the established SLA during the execution of the application.

2. The system of claim 1, wherein the scaling capability is determined for a multiplicity of components of the application and the resource utilization options are filtered for the SLA based upon a most limited scaling capability determined amongst all of the components.

3. The system of claim 1, wherein the scaling capability is a scaling and de-scaling capability and the resource utilization options for the SLA include a range of resource utilization outside of which resources are either added for scaling or removed for de-scaling.

4. The system of claim 1, wherein the scaling capability is a caching capability.

5. The system of claim 3, wherein the scaling and de-scaling capability includes a capability of vertical scaling and horizontal scaling.

6. The system of claim 3, wherein the scaling and de-scaling capability includes a capability of vertical scaling but not horizontal scaling.

7. The system of claim 3, wherein the scaling and de-scaling capability includes a capability of horizontal scaling but not vertical scaling.

8. A computer program product for dynamic adjustment of a service level agreement (SLA) for a hosted computing environment based upon application capabilities, the computer program product comprising a computer readable storage medium having program instructions embodied therewith, wherein the computer readable storage medium is not a transitory signal per se, the program instructions executable by a device to cause the device to perform a method comprising:

specifying in a user interface to a hosted computing environment executing in memory by one or more processors of a computing device, a virtual application pattern comprising one or more application components of an applications to be hosted within the hosted computing environment, a behavioral policy, at least one database, at least one queue, at least one connection to an existing resource, a business process model, a batch job and a mediation, the policy specifying high availability, security, multi-tenancy, isolation and an SLA;

loading the SLA into memory and accessing a table specifying capabilities of the different components of the pattern including both whether or not one or more of the components support placement of corresponding instances of the components in one or more of multiple different nodes and also whether or not one or more of the components support the utilization of multiple different processors within the hosted computing environment;

determining in the table a scaling capability for at least one of the components and in particular both whether or not one or more of the application components support placement of corresponding instances of the application components in one or more of multiple different nodes in the hosted computing environment, and also whether or not one or more of the application components support utilization of multiple different processors within the hosted computing environment;

filtering a set of resource utilization options for the SLA of the pattern for the application based upon the common scaling capability of all of the components, selecting one of the filtered set of resource utilization options for the SLA and modifying the SLA for the application utilizing the selected resource utilization options so as to scale up resources utilized by the components of the application; and, executing the application in the hosted computing environment and managing resource utilization of resources accessible to the application based upon the established SLA during the execution of the application in the hosted computing environment.

9. The computer program product of claim 8, wherein the scaling capability is determined for a multiplicity of components of the application and the resource utilization options are filtered for the SLA based upon a most limited scaling capability determined amongst all of the components.

10. The computer program product of claim 8, wherein the scaling capability is a scaling and de-scaling capability and the resource utilization options for the SLA include a range of resource utilization outside of which resources are either added for scaling or removed for de-scaling.

11. The computer program product of claim 8, wherein the scaling capability is a caching capability.

12. The computer program product of claim 10, wherein the scaling and de-scaling capability includes a capability of vertical scaling and horizontal scaling.

13. The computer program product of claim 10, wherein the scaling and de-scaling capability includes a capability of vertical scaling but not horizontal scaling.

14. The computer program product of claim 10, wherein the scaling and de-scaling capability includes a capability of horizontal scaling but not vertical scaling.

* * * * *